US012628127B2

(12) United States Patent
Khoryaev et al.

(10) Patent No.: US 12,628,127 B2
(45) Date of Patent: May 12, 2026

(54) INTER-USER EQUIPMENT (UE) COORDINATION INFORMATION FOR NEW RADIO (NR) SIDELINK COMMUNICATION

(71) Applicant: Intel Corporation, Santa Clara, CA (US)

(72) Inventors: Alexey Khoryaev, Nizhny Novgorod (RU); Mikhail Shilov, Nizhny Novgorod (RU); Sergey Panteleev, Kildare (IE); Kilian Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/094,875

(22) Filed: Jan. 9, 2023

(65) Prior Publication Data

US 2023/0164745 A1 May 25, 2023

Related U.S. Application Data

(60) Provisional application No. 63/298,153, filed on Jan. 10, 2022, provisional application No. 63/298,062, filed on Jan. 10, 2022.

(51) Int. Cl.
*H04W 72/02* (2009.01)
*H04W 72/25* (2023.01)
*H04W 80/02* (2009.01)

(52) U.S. Cl.
CPC ........... *H04W 72/02* (2013.01); *H04W 72/25* (2023.01); *H04W 80/02* (2013.01)

(58) Field of Classification Search
CPC ..... H04W 72/02; H04W 72/25; H04W 80/02; H04W 4/44; H04W 74/0816
See application file for complete search history.

(56) References Cited

U.S. PATENT DOCUMENTS

| | | | | |
|---|---|---|---|---|
| 2023/0217463 A1* | 7/2023 | Hui | ....................... | H04W 72/25 |
| | | | | 370/329 |
| 2024/0284480 A1* | 8/2024 | Nguyen | ................ | H04W 28/26 |
| 2024/0389114 A1* | 11/2024 | Wu | ........................ | H04W 76/14 |
| 2025/0097957 A1* | 3/2025 | Guo | ...................... | H04L 5/0094 |
| 2025/0106876 A1* | 3/2025 | Hayashi | ................ | H04W 72/20 |

OTHER PUBLICATIONS

3GPP, "3rd Generation Partnership Project; Technical Specification Group Radio Access Network; NR; Multiplexing and channel coding (Release 16)", 3GPP TS 38.212 V16.7.0, Sep. 2021, 153 pages.

(Continued)

*Primary Examiner* — Habte Mered
(74) *Attorney, Agent, or Firm* — Gray Ice Higdon, PLLC

(57) ABSTRACT

Various embodiments herein provide techniques for sending and receiving inter-user equipment (UE) coordination information for sidelink communication. The inter-UE coordination information may be provided via sidelink control information (SCI) and/or medium access control-control element (MAC-CE). Aspects regarding resource reservation and/or indication for UE coordination information are described. Additionally, new SCI formats for inter-UE coordination information are provided. Other embodiments may be described and claimed.

17 Claims, 6 Drawing Sheets

600 receiving an indication of a first resource set for inter-UE coordination information from another UE for sidelink communication
602

↓ selecting a second resource set for a transmission by the UE based on the first resource set, wherein resources of the first resource set are excluded from consideration for the second resource set if the feedback information is to be transmitted using medium access control – control element (MAC-CE) signaling and sidelink control information (SCI) signaling and the resources are after a first time period from the indication, and wherein resources of the first resource set are excluded from consideration for the second resource set if the feedback information is to be transmitted using only MAC-CE signaling and the resources are after a second time period from the indication, wherein the second time period is longer than the first time period
604

(56)     References Cited

OTHER PUBLICATIONS

3GPP, "3rd Generation Partnership Project; Technical Specification Group Radio Access Network; NR;Physical layer procedures for control (Release 16)", 3GPP TS 38.213 V16.7.0, Sep. 2021, 188 pages.

3GPP, "3rd Generation Partnership Project; Technical Specification Group Radio Access Network; NR; Physical layer procedures for data (Release 16)", 3GPP TS 38.214 V16.7.0, Sep. 2021, 172 pages.

3GPP, "3rd Generation Partnership Project; Technical Specification Group Radio Access Network; NR; Radio Resource Control (RRC) protocol specification (Release 16)", 3GPP TS 38.331 V16.7.0, Dec. 2021, 963 pages.

* cited by examiner

600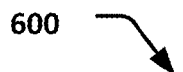

receiving an indication of a first resource set for inter-UE
coordination information from another UE for sidelink
communication
602 selecting a second resource set for a transmission by the UE based
on the first resource set, wherein resources of the first resource set
are excluded from consideration for the second resource set if the
feedback information is to be transmitted using medium access
control – control element (MAC-CE) signaling and sidelink
control information (SCI) signaling and the resources are after a
first time period from the indication, and wherein resources of the
first resource set are excluded from consideration for the second
resource set if the feedback information is to be transmitted using
only MAC-CE signaling and the resources are after a second time
period from the indication, wherein the second time period is
longer than the first time period
604

Figure 6

INTER-USER EQUIPMENT (UE) COORDINATION INFORMATION FOR NEW RADIO (NR) SIDELINK COMMUNICATION

CROSS REFERENCE TO RELATED APPLICATION

The present application claims priority to U.S. Provisional Patent Application No. 63/298,062, which was filed Jan. 10, 2022; and U.S. Provisional Patent Application No. 63/298, 153, which was filed Jan. 10, 2022; the disclosures of which are hereby incorporated by reference.

FIELD

Various embodiments generally may relate to the field of wireless communications. For example, some embodiments may relate to inter-user equipment (UE) coordination information for new radio (NR) sidelink communication.

BACKGROUND

New radio (NR) Vehicle-to-anything (V2X) sidelink communication is a synchronous communication system with distributed resource allocation. User equipments (UEs) autonomously select resources for sidelink transmission based on predefined sensing and resource selection procedures implemented by transmit (TX) UEs. The sensing and resource selection procedures are designed to reduce potential sidelink conflicts in transmissions or resource reservations (e.g., collisions or half-duplex conflicts). Given that sensing and resource selection procedures are executed only by TX UEs and do not consider the environment at the receiver side there is non-negligible probability of sidelink conflicts (collisions). To address this problem, the inter-UE coordination feedback from RX UEs can be used to improve resource allocation decisions by TX UEs and improve overall reliability of NR-V2X sidelink communication.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 depicts an example procedure for practicing the various embodiments discussed herein.

DETAILED DESCRIPTION

Figure 1:
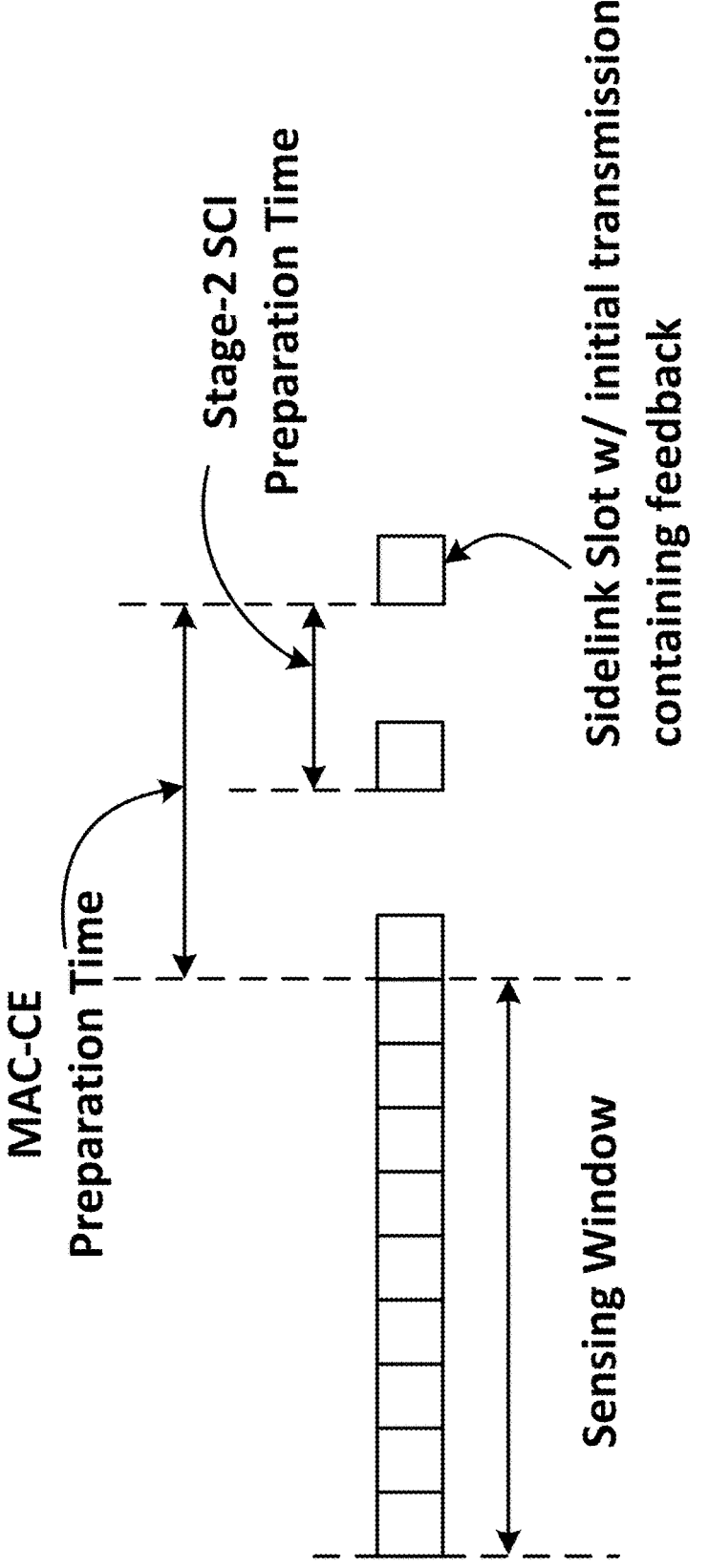
FIG. 1 illustrates Stage-2 sidelink control information (SCI) and medium access control-control element (MAC-CE) preparation timelines, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for sending and receiving inter-user equipment (UE) coordination information for sidelink communication. The inter-UE coordination information may be provided via sidelink control information (SCI) and/or medium access control-control element (MAC-CE). Aspects regarding resource reservation and/or indication for UE coordination information are described. Additionally, new SCI formats for inter-UE coordination information are provided.

New radio (NR) Vehicle-to-anything (V2X) sidelink communication is a synchronous communication system with distributed resource allocation. UEs autonomously select resources for sidelink transmission based on predefined sensing and resource selection procedures implemented by transmit (TX) UEs. The sensing and resource selection procedures are designed to reduce potential sidelink conflicts in transmissions or resource reservations (e.g., collisions or half-duplex conflicts). Given that sensing and resource selection procedures are executed only by TX UEs and do not consider the environment at the receiver side there is non-negligible probability of sidelink conflicts (collisions). To address this problem, the inter-UE coordination feedback from RX UEs can be used to improve resource allocation decisions by TX UEs and improve overall reliability of NR-V2X sidelink communication.

Inter-UE coordination solutions are being designed for NR V2X sidelink communication as a part of the third generation partnership project (3GPP) Release-17 (Rel. 17) work item on sidelink enhancements. Two high level inter-UE coordination solutions have been identified in 3GPP to improve NR V2X sidelink performance:

Inter-UE coordination scheme #1 (sidelink conflict/collision avoidance)

This scheme aims to utilize inter-UE coordination feedback to avoid half-duplex and collisions problems for NR V2X communication. The basic principle behind this solution is that a UE providing inter-UE coordination feedback will report preferred and/or non-preferred sets of resources to surrounding sidelink transmitters. Sidelink transmitters will apply TX based sensing procedures and use received inter-UE coordination feedback to select/reserve sidelink resources for transmission and avoid potential sidelink communication conflicts.

Inter-UE coordination scheme #2 (sidelink conflict resolution)

This scheme aims to utilize inter-UE coordination feedback to resolve sidelink conflicts that either already occurred or potential future conflicts that were detected based on resource reservation signaling. The idea behind this approach is to inform sidelink transmitters about detected sidelink conflicts through inter-UE coordination feedback, so that TX UEs can either perform additional retransmission, or drop planned transmission and reselect resource for transmission or continue transmission on reserved resource.

It was agreed that the M triplets/combinations of the time resource indication value (TRIV), frequency resource indication value (FRIV) and Preserved according to the 3GPP Release-16 (Rel.16) definition are transmitted. For the range of values of M less or equal to 3 this information can be transmitted in the second stage sidelink control information (SCI). This leaves a lot of open signaling details as well as the SCI formats that are described herein.

Specifically, embodiments herein relate to first and second stage SCI information to enable transmission of preferred or non-preferred resource sets in the second stage SCI. It also describes related fields to resource signaling irrespective of the information container. Embodiments herein may the use of inter-UE coordination for resource allocation for Rel. 17 sidelink (SL). Specific embodiments may relate to one or more of the 3GPP technical specifications (TSs) 38,212, 38.213, 38.214, and 38.331.

$2^{nd}$ Stage SCI Formats Indication for Inter-UE Coordination

After decoding the $1^{st}$ stage SCI all necessary information to decode the $2^{nd}$ stage SCI needs to be available. As the current $2^{nd}$ stage SCI formats do not include the resource information for inter-UE coordination this means at least one additional $2^{nd}$ stage SCI format needs to be defined. However, now there are different $2^{nd}$ stage SCI formats fulfilling different communication needs. Thus, we see two solution to the $2^{nd}$ stage SCI format indication:

Two or more different $2^{nd}$ stage SCI formats are indicated in the $1^{st}$ stage SCI Only one additional $2^{nd}$ stage SCI format is indicated in the $1^{st}$ stage SCI. The presence of different $2^{nd}$ stage SCI fields is conditional on sub-format indication in the $2^{nd}$ stage SCI information itself.

For sensing purposes, it may is still be important that even devices that do not implement inter-UE coordination can at least decode the $1^{st}$ stage SCI information and at most demodulate and decode PSSCH. In Rel.16, there are 2 different SCI formats defined in the 1st stage SCI field "2nd-stage SCI format". As this bit field is 2 bits long there are 2 additional reserved entries available. In addition, up to 4 reserved bits for the 1st stage SCI can be configured per resource pool.

If separate feedback signaling is defined for the preferred set, the non-preferred set and the non-preferred set with half duplex resources, the following signaling options can be considered in Table 1.

TABLE 1

| Resource set options. | | | |
|---|---|---|
| | Preferred resource set (1-A-1 or 1-A-1 + 1-A-2) | Non-preferred resource set (1-B-1) | Non-preferred half duplex set (1-B-2) |
| Option 1 | X | X | X |
| Option 2 | X | | X |
| Option 3 | | X | X |
| Option 4 | X | X | |
| Option 5 | X | | |
| Option 6 | | X | |

Combining the number of options for inter-UE coordination signaling will also enabling both current $2^{nd}$ stage SCI formats (A and B) means that we would need to signal up to 12 $2^{nd}$ SCI formats. Large amount of new $2^{nd}$ stage SCI formats designed for inter-UE coordination feedback is not justified and alternative solutions with minimum number of new stage-2 SCI formats should be pursued.

Indication of the $2^{nd}$ Stage SCI Formats in the $1^{st}$ Stage SCI:

Full $2^{nd}$ stage SCI format indication in the 1st stage SCI can be signaled via multiple ways as briefly described/introduced in the next paragraph's.

All used combinations of current 2nd stage SCI formats and inter-UE coordination set options are defined as a separate $2^{nd}$ stage format. The configuration can be dependent on:

Inter-UE coordination information

Resource pool configuration

Via this configuration or via limiting the number of defined/supported it is possible to limit the number of the $2^{nd}$ stage formats.

It is also possible to add inter-UE coordination information to the Rel.16 $2^{nd}$ stage SCI formats. Which resource sets are signaled in the SCI can be separately indicated via an additional field in the $1^{st}$ stage SCI. For example, SCI format 2-C would be SCI format 2-A with inter-UE coordination. Also, in this case it is possible to restrict the option for resource sets to be signaled via the following configuration.

Inter-UE coordination information

Resource pool configuration

Indication of the $2^{nd}$ Stage Inter-UE Coordination Formats in the $2^{nd}$ Stage SCI In this case the selection which information is contained in the inter-UE coordination is dependent on fields in the 2nd stage SCI. This means some new 2nd stage SCI formats are created and all additional information of which inter-UE coordination format is present is contained in the second stage SCI. An example would be that two additional 2nd stage SCI formats 2-C and 2-D are created. These would represent format 2-A and 2-B with inter-UE coordination feedback. Which resource sets are present in the 2nd stage SCI is then indicated in the 2nd stage SCI itself. In another embodiment, only one new SCI format can be introduced for the purpose of inter-UE coordination feedback e.g., SCI format 2-C. In this case, the 2nd stage SCI should also indicate whether fields of SCI format 2-A and 2-B are used together with inter-UE coordination format.

Depending on signaling design, actual size of the 2nd stage SCI can be different. The maximum number of the 2nd stage SCI bits need to be known a priori (e.g., before channel coding as at the receiver, as it is not possible to know which option is taken before the channel decoding). If for given indication option, the actual $2^{nd}$ stage SCI size is smaller than the predefined maximum, then dummy bits need be inserted to align with maximum size (e.g., size-matching need to be performed).

Indication of $2^{nd}$ Stage Format the Number of Resources in the $1^{st}$ Stage In this case there would be 2 additional formats indicated in the $1^{st}$ SCI. These would present the Rel.16 formats with inter-UE coordination feedback. In addition, the reserved bits available in the $1^{st}$ stage SCI would be used to indicate the number of resources that are signaled in the $2^{nd}$ stage SCI. This has the advantage that the sized for the bits in the $2^{nd}$ stage SCI does not always need to use the maximum number of bits as number of signaled triplets is known after the $1^{st}$ stage SCI.

Inter-UE Coordination Resource Indication

N triplets of TRIV, FRIV and Preserve should be used. However, the Rel-16 1st stage SCI version of the FRIV does not contain information of the first frequency allocation as in its original purpose this was already known. As in the original signaling the value of "sl-MaxNumPerReserve" also needs to be known. For Rel-16 1st stage SCI this value is configured as part of the resource pool configuration and represents the number of resource that are signaled per TRIV and FRIV. Also, the first slots are not indicated for the TRIV in Rel-16 1st stage SCI as the current slot is known. All options for these additional parameters as well as overhead saving options when multiple sets are signaled need to be discussed. It is also clear that to calculate the SCI size the maximum number of bits out of all supported/configured options need to be used as which option is actually taken is unknown before channel decoding, but the number of bits that need to be decoded needs to be known a priori. Note that different signaling option for each value can be chosen for the case of SCI or medium access control (MAC) control element (CE) signaling of these values.

Signaling of sl-MaxNumPerReserve:

In principle it would be possible to have a different value for each of the signaled resources. This would enable the full flexibility of signaling resources, but also result in a large overhead. The following options illustrate the different ways to enable UE A and UE B to have the same understanding of the value used:

sl-MaxNumPerReserve is pre-configured: The pre-configuration would be contained in the resource pool. Potentially this configuration is different for different resource sets.

sl-MaxNumPerReserve is signaled per triplet of TRIV, FRIV and Preserve. In this case the used value is explicitly signaled.

sl-MaxNumPerReserve is contained in the coordination request information sl-MaxNumPerReserve is configured by the network sl-MaxNumPerReserve is negotiated during unicast- or groupcast connection setup Signaling of the Number of Resources N in a Resource Set:

The following list illustrates all options for this case. Please note that different options could be chose for the signaling in the SCI and MAC CE based signaling:

N is fixed (Field size 0 as no dynamic signaling): In this case the value that is used for inter-UE coordination can be determined based on one of following options:

Pre-configured

Configured by the network

Send during the inter-UE coordination request

Negotiated during unicast- or groupcast connection setup

N is dynamically signaled (Field size $\lceil \log_2 N_{max} - N_{min} \rceil$): In this case N is explicitly signaled. A value from $N_{max}$ to $N_{min}$ need to be defined as otherwise the required field size is unknown. The value range be defined dependent on the following options:

Pre-configured

Configured by the network

Send during the inter-UE coordination request

Negotiated during unicast- or groupcast connection setup

Signaling of the Starting Slot:

As in the original definition of the TRIV the current slot is defined as the starting slot it is necessary to signal the starting slot for inter-UE coordination. A different form of signaling can be used if some slot information of other triplets is already available. This can take different forms:

Signaling the frame number modulo L (Field size $\lceil \log_2 L \rceil$). This can also be used for each triplet separately. Not that this is essentially sending the last L bits of the system frame number, thus the indication is relative to the system frame where last the numbers rolled over the bit higher than the L transmitted bits.

Signaling the slot offset to the feedback transmission: (Field size dependent on maximum distance). Note that it is possible that the initial transmission of the feedback is not received due to a decoding failure, half duplex problem or any reason leading to a missed transmission. In this case the retransmission is in a different slot with potentially no reference to the first one. This means this does not work for all cases. However, for SCI signaling as no HARQ combining needs to be assume different information about the slot can be send at different retransmissions of the same TB.

Signaling the slot offset to another a reference slot for resource allocation in time (Field size depending on maximum distance). In this case a frame is taken as a reference. This can either be another slot already signaled for another TRIV or take the feedback request as a reference. It is also possible that the feedback request contains a slot that should be used as a reference for the feedback transmission.

Signaling of the TRIV:

No changes need to be made to the TRIV as this contains already the full flexibility of signaling. It is however possible to adapt the window size of the TRIV the Rel. 16 version in clause 8.1.5 of 38.214 to a configurable window size. The current version is only allowing a window of 32 logical slots (This results in a maximum distance in slots as only the distance to the current slot is signaled).

Signaling of the FRIV:

FRIV indication assumes that due to the decoding of the PSCCH the starting sub-channel in the current slot is known. Thus, this is not signaled. However, this is not the case for signaling resource sets. There are the following options:

Signaling of starting sub-channel for reference slot (Field size dependent on allocation size): To accommodate for the missing information signal the starting slot of the frequency resource in the reference slot.

Reinterpretation of starting sub-channel signaling. This means that the starting sub-channels of the current signaling would be reinterpreted and only up to 2 resource can be signaled. If sl-MaxNumPerReserve is configured as 2 than the starting sub-channel that would be signaled for the $2^{nd}$ resource according to the Rel-16 definition is interpreted as the starting sub-channel of the only signaled resource. In the same fashion if MaxNumPerReserve is configured as 3 for the Rel-16 definition the starting sub-channel of the $2^{nd}$ and $3^{rd}$ resource are explicitly signaled. These would be reinterpreted as the starting sub-channel of the $1^{st}$ and $2^{nd}$ resource in the inter-UE coordination signaling.

Signaling of the Preserve:

As the resource pool configuration is limiting the set of Preserve an index relative to the allowed configurations is sufficient (Field size is dependent on the number of configured Preserve values).

Overhead Saving when Signaling Multiple Sets:

Multiple sets could use the same reference slot relative to which the starting slot of each triplet is signaled or the n-th resource (e.g., n=1) of the k-th set can serve as a reference for (k+1)th resource set.

Multiple sets could use the same number of triplets N. This means these do not need to be signaled separately for each set.

Overhead Saving when Signaling Half Duplex Set:

As for this set only time information is necessary no transmission of the frequency allocation information with the FRIV is necessary. This means it can be omitted for this set.

Sidelink Communication with Inter-UE Coordination Feedback Over Multiple Containers As discussed above, the inter-UE coordination framework is being developed in 3GPP Rel.17 to improve reliability of the sidelink communication by reducing probability of collisions. The main principle behind inter-UE coordination is delivery of feedback information to transmitters aiming to improve resource selection procedure considering feedback information from potential/target receivers. The inter-UE coordination feedback may contain information on preferred and non-preferred resource sets that are determined based on medium sensing procedure. The performance benefits from using inter-UE coordination solutions depend on the latency of the feedback delivery. The latency of feedback delivery depends on multiple factors, including channel access procedure and processing delays associated with a container carrying feedback information. There is also a tradeoff between amount of feedback information that can be delivered and latency of the delivery.

In various embodiments, two containers may be used for delivery of feedback information for NR sidelink communication: 1) Stage-2 SCI and 2) MAC CE signaling. The potential benefits for such embodiment are as follows: 1) SCI based solution can provide lower latency for a limited set of information and 2) MAC CE based solution can provide more information at the expense of latency increase.

In prior systems, there was no inter-UE coordination solutions defined for sidelink communication technology of cellular communication systems. The existing solutions for sidelink communication only consider TX based sensing procedure to select resource for transmission and do not utilize feedback from receivers.

The main disadvantage of the existing solution is not sufficient level of information on resource utilization and thus the lower achievable reliability level.

Various embodiments herein may include techniques for sidelink communication with inter-UE coordination feedback over multiple containers. The embodiments may provide one or more of the following advantages:

Reduced latency of the inter-UE coordination feedback delivery

Increased reliability of sidelink V2X communication

Low incremental complexity as it reuses many of existing components of NR sidelink communication framework as well as timely delivery of inter-UE coordination information.

Latency Benefits

Latency benefit is a main argument to support stage-2 SCI container for inter-UE coordination feedback (preferred resource set) on top of MAC-CE container. The potential latency benefits of using stage-2 SCI container may come from reduced time for the following latency components:

MAC-CE and Stage 2 SCI preparation time, including PSCCH/PSSCH preparation time

Transmission time and reception time

PSCCH/PSSCH transmission duration, including number of retransmissions

Decoding time for PSCCH/PSSCH

MAC-CE vs Stage 2 SCI processing time

MAC-CE and Stage-2 SCI Preparation Time

The MAC-CE and Stage-2 SCI preparation time is expected to be different (e.g., by default Tprep,SCI2≤Tprep, MAC-CE) as different radio layers are used to deliver information (physical and MAC layer respectively). This may result in the use of different timelines and thus use of different preferred and/or non-preferred resource sets for signaling in Stage-2 SCI container and MAC-CE container. The meaning of "different" here mainly means that resource set carried in a container with lower preparation time may be less outdated (as it can be generated later) than resource set associated and carried in a container with higher preparation time (refer to FIG. 1).

The resource set for inter-UE coordination feedback is expected to be updated every slot and thus information in Stage-2 SCI and MAC-CE containers may have different aging time and eventually may have some misalignment/mismatch (e.g., resource indicated as preferred in MAC-CE container may be detected as already reserved and thus not included in Stage-2 SCI container). This misalignment can be resolved at the UE that receives inter-UE coordination feedback and applies it for selection of resources for transmission.

In one embodiment, to simplify design, content of both containers can be associated with the same resource set corresponding to container with maximum preparation time (e.g., obtained corresponding to the max(Tprep,SCI2, Tprep,MAC-CE)).

To minimize outdate/aging time of inter-UE coordination feedback, the end slot of sensing window used for generation of preferred/non-preferred resource set should be determined by preparation time and time instance of initial transmission, so that only the most recent sensing results are included in inter-UE coordination feedback containers. In one embodiment, the time T3=Tproc,1 can be reused to bound MAC-CE and Stage-2 SCI preparation time(s) across all UEs. In another embodiment, the new and processing times can be defined for MAC CE and Stage-2 SCI preparation times and include PSCCH/PSSCH preparation time or defined on top of PSCCH/PSSCH preparation time as an additional processing delays at UE transmitting feedback.

Resource Selection for Stage-2 SCI

In one embodiment the Stage-2 SCI container is expected to carry inter-UE coordination information pointing to preferred resource set. In another embodiment, non-preferred resource set or both preferred and non-preferred resource sets can be signaled. UE behavior/procedure for selection of resources indicated in Stage-2 SCI container needs to be discussed so that latency benefits of using Stage-2 SCI container can be practically realized vs the MAC-CE option.

To achieve latency benefits, resources indicated in Stage-2 SCI should be selected from earlier in time resources of the resource set. Indicated resources should happen earlier than the slot associated with successful decoding and processing of MAC-CE, otherwise there is no latency gain comparing with the MAC-CE container. It should be clarified that time instance(s) for successful decoding and processing of Stage-2 SCI and MAC-CE is unknown in advance and may depends on number of retransmissions/retransmission index.

To extract latency benefits, the inter-UE coordination feedback resources indicated in Stage-2 SCI should meet the following timing condition(s):

$$t_{TX\text{-}SCI\text{-}2,n} + T_{proc,SCI\text{-}2} \leq t_{res,m} \leq t_{TX\text{-}MAC\text{-}CE,k} + T_{proc,MAC\text{-}CE}$$

$$t_{RX\text{-}SCI\text{-}2,n} \leq t_{TX\text{-}SCI\text{-}2,n} + T_{proc,SCI\text{-}2}$$

$$t_{RX\text{-}MAC\text{-}CE,k} \leq t_{TX\text{-}MAC\text{-}CE,k} + T_{proc,MAC\text{-}CE}$$

where, $t_{RX\text{-}SCI\text{-}2,n}$—time instance/slot index, where Stage-2 SCI carrying preferred resource(s) is successfully decoded from the n-th transmission at slot $t_{TX\text{-}SCI\text{-}2,n}$ ($0 < n \leq N_0$, where $0 < N_0 \leq 32$ is the number of (re)-transmissions) and processed here, $t_{TX\text{-}SCI\text{-}2,n} \leq t_{TX\text{-}SCI\text{-}2,n} + T_{proc,SCI\text{-}2}$; where, $T_{proc,SCI\text{-}2}$—upper bound on Stage 2 SCI processing time at RX side (in another embodiment lower bound on Stage 2 SCI processing or actual stage 2 SCI processing time can be used);

$t_{TX\text{-}SCI\text{-}2,n}$—time instance/slot index, where the n-th transmission of Stage-2 SCI container carrying feedback resource(s) is transmitted;

$t_{res,m}$—time instance/slot index, corresponding to the m-th preferred resource carried in Stage-2 SCI (m=0, 1, 2, . . . , M, e.g., M=9);

$t_{RX\text{-}MAC\text{-}CE,k}$—time instance/slot index, where MAC-CE carrying preferred resource(s) is successfully decoded from the k-th transmission ($k \leq K$) and processed The $t_{RX\text{-}MAC\text{-}CE,k} \leq t_{TX\text{-}MAC\text{-}CE,k} + T_{proc,MAC\text{-}CE}$; where, $T_{proc,MAC\text{-}CE}$— upper bound on MAC-CE processing time at RX side (in another embodiment lower bound on MAC-CE processing or actual MAC-CE processing time can be used)

Figure 2:
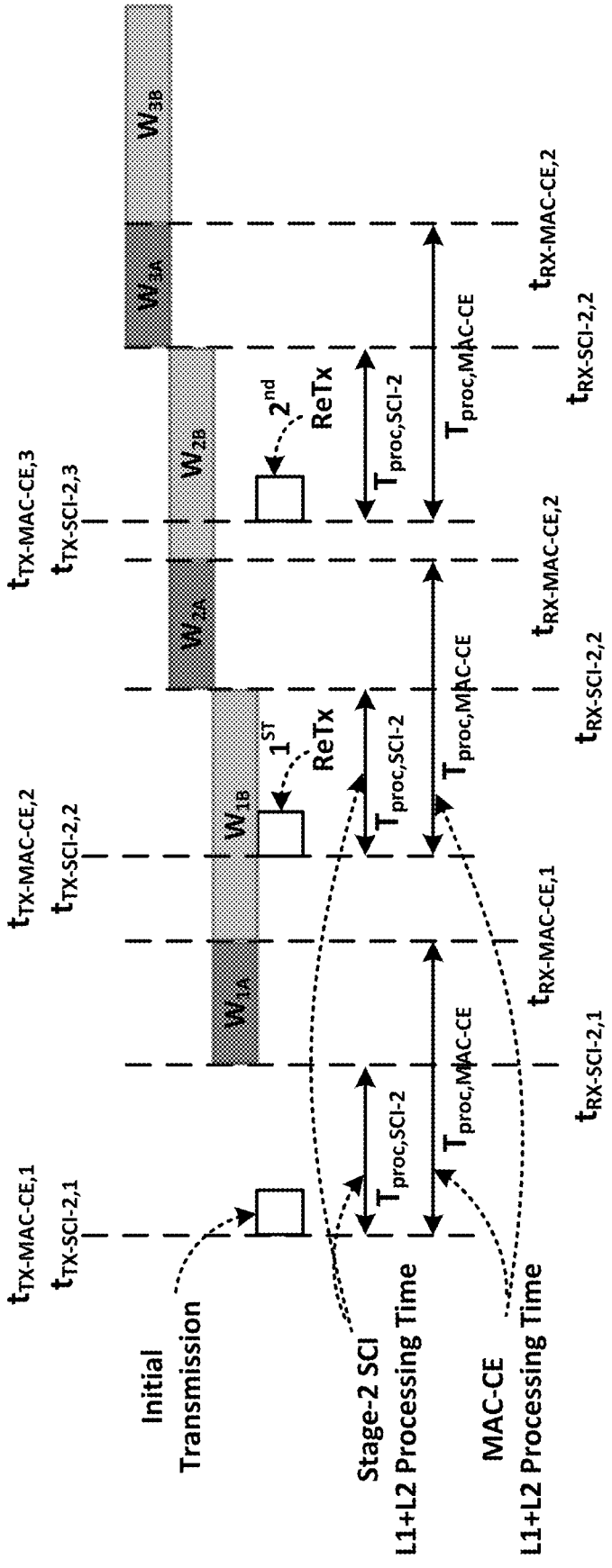
FIG. 2 illustrates Stage-2 SCI and MAC-CE processing timelines, in accordance with various embodiments.

$t_{RX\text{-}MAC\text{-}CE,k}$—time instance/slot index, where the k-th transmission of MAC-CE carrying preferred resource(s) is transmitted FIG. 2 illustrates an example of Stage-2 SCI and MAC-CE processing timelines, in accordance with various embodiments.

Example 1—Initial Transmission Only

For the case, when UE intends to transmit a TB only once (e.g., only initial transmission), the resources indicated in Stage-2 SCI should be within the window ($t_{RX\text{-}SCI\text{-}2,1} = t_{TX\text{-}MAC\text{-}CE,1} = t_{TX,1}$)

$$t_{TX\text{-}SCI\text{-}2,1} + T_{proc,SCI\text{-}2} \leq t_{res,m} \leq t_{TX\text{-}MAC\text{-}CE,1} + T_{proc,MAC\text{-}CE}$$

$$t_{TX,1} + T_{proc,SCI\text{-}2} \leq t_{res,m} \leq t_{TX,1} + T_{proc,MAC\text{-}CE}$$

Indication of resources outside of this interval (represented by $W_{1A}$ in FIG. 2) may either not have latency benefits (if ($t_{TX,1} + T_{proc,MAC\text{-}CE}) \leq t_{res,m}$) or result in outdated inter-UE coordination information (if $t_{res,m} \leq (t_{TX,1} + T_{proc,SCI\text{-}2})$).

Example 2—Initial Transmission+One Re-Transmission

For the case, when UE intends to transmit a TB two times (e.g., initial transmission and one re-transmission), the resources indicated in Stage-2 SCI should be either within.

1. Window $W_{1A}$: $t_{TX\text{-}SCI\text{-}2,1} + T_{proc,SCI\text{-}2} \leq t_{res,m} \leq t_{TX\text{-}MAC\text{-}CE,1} + T_{proc,MAC\text{-}CE}$
   i. If both Stage-2 SCI and MAC-CE are expected to be received from initial transmission
2. Window $W_{1A} + W_{1B}$: $t_{TX\text{-}MAC\text{-}CE,1} + T_{proc,MAC\text{-}CE} \leq t_{res,m} \leq t_{TX\text{-}SCI\text{-}2,2} + T_{proc,SCI\text{-}2}$
   i. If Stage-2 SCI is received from initial transmission and MAC-CE is not received during initial transmission
3. Window $W_{2A}$: $t_{TX\text{-}SCI\text{-}2,2} + T_{proc,SCI\text{-}2} \leq t_{res,m} \leq t_{TX\text{-}MAC\text{-}CE,2} + T_{proc,MAC\text{-}CE}$
   i. If Stage-2 SCI is received from the 1$^{st}$ re-transmission and MAC-CE is not received during initial transmission. There is no point to indicate resources in $W_{1A} + W_{1B}$, if Stage-2 SCI is not received from the initial transmission (outdated)

4. Window $W_{2A} + W_{2B}$: $t_{TX\text{-}MAC\text{-}CE,2} + T_{proc,MAC\text{-}CE} \leq t_{res,m} \leq t_{TX\text{-}SCI\text{-}2,3} + T_{proc,SCI\text{-}2}$
   i. Stage-2 SCI is received from the 1$^{st}$ re-transmission and MAC-CE is not received from the 1$^{st}$ re-transmission Based on example 1 and 2, UE should select first in time resources for indication in Stage-2 SCI. There is no need to use k-th Stage-2 SCI, for indication of the m-th resource that satisfies the following condition (as it can be delivered in MAC-CE).

$$t_{res,m} > t_{TX\text{-}MAC\text{-}CE,k} + T_{proc,MAC\text{-}CE}$$

Considering that Stage-2 SCI transmission cannot be combined (HARQ combining) it is beneficial to support indication of new resources in each Stage-2 SCI transmission. At the same time whether to indicate resources in Stage-2 SCI and whether to update resources in each Stage-2 SCI transmission should be left up to UE implementation as it depends on timing relationship of the resources for feedback and resources used for feedback transmission considering Stage 2 and MAC-CE processing delays.

Design Principles for Stage-2 SCI+MAC-CE for Inter-UE Coordination Feedback

The following design principles can be used for sidelink communication and inter-UE coordination feedback over Stage-2 SCI and MAC-CE containers:

1. Preferred/non-preferred resource sets for inter-UE coordination feedback in MAC-CE container are generated T slots prior the slot with initial transmission carrying inter-UE coordination feedback
   i. The content of resource sets indicated in MAC-CE container does not change in subsequent re-transmission carrying the same TB
   ii. MAC-CE includes time offset field pointing to the start slot of the resource selection window used for feedback or to the slot with the first in time resource of indicated resource sets. Alternatively, slot index of initial transmission or some other time reference can be used
2. First(early) in time resource selection procedure is applied to inter-UE coordination feedback resource set for determination of the sub-set of preferred/non-preferred resources indicated in Stage-2 SCI container. The following options can be used to determine windows for sub-set of preferred resources indicated in Stage-2 SCI:
   i. Option 1: Resources in time window, $[n_k + T_{proc,SCI\text{-}2}, n_k + T_{proc,MAC\text{-}CE}]$, here $n_k$ is a slot of k-th Stage-2 SCI transmission for a given TB (e.g., for initial transmission k=1)
   ii. Option 2: Resources in time window, $[n_k + T_{proc,SCI\text{-}2}, n_{k+1} + T_{proc,SCI\text{-}2}]$, here $n_k$ is a slot of k-th Stage-2 SCI transmission for a given TB (e.g., for initial transmission k=1)
   iii. Option 3: Resources in time window, $[n_k + T_{proc,SCI\text{-}2}, n_{k+1} + T_{proc,MAC\text{-}CE}]$, here $n_k$ is a slot of k-th Stage-2 SCI transmission for a given TB (e.g., for initial transmission k=1)
   iv. Option 4: Resources in time window, $[n_k + T_{proc,SCI\text{-}2}, n_{k+m} + T_{proc,SCI\text{-}2}]$, here $n_k$ is a slot of k-th Stage-2 SCI transmission for a given TB (e.g., for initial transmission k=1)

v. Option 5: Resources in time window, [$n_k$+$T_{proc,SCI-2}$, $n_{k+m}$+$T_{proc,MAC-CE}$], here $n_k$ is a slot of k-th Stage-2 SCI transmission for a given TB (e.g., for initial transmission k=1)

3. Re-evaluation of feedback resources indicated in Stage 2 SCI transmission(s) to provide the most recent feedback information i. Dynamic indication and update of feedback resources indicated in each Stage-2 SCI transmission 4. The following UE behaviors are possible in terms of selecting resources for indication in MAC-CE and Stage-2 SCI i. Option 1. The resource set(s) generated for MAC-CE container is re-used for determination of sub-set of resources indicated in Stage-2 SCI container in all transmissions of a given TB ii. Option 2. The resource set(s) generated for MAC-CE container is re-used for determination of sub-set of resources indicated in Stage-2 SCI container. The sub-set of Stage-2 SCI resources is re-evaluated for all transmissions of a given TB using the valid set of resources indicated in MAC-CE iii. Option 3. The resource set(s) for determination of sub-set of resources indicated in Stage-2 SCI container is re-evaluated for each transmission of a given TB (e.g., initial, and sub-sequent transmissions, or only sub-sequent transmissions)

iv. In all above options, the content of inter-UE coordination resource set(s) indicated in MAC-CE does not change during initial transmission and subsequent (re)-transmissions of a given TB, while the sub-set of resources indicated in Stage-2 SCI can be re-evaluated for initial transmission and sub-sequent (re)-transmissions or only sub-sequent (re)-transmissions.

5. Dynamic indication of the number of resources/resource combinations signaled in each Stage-2 SCI transmission {0, 1, 2, . . . , M}. Maximum number of resources indicated is configurable from {0, 1, 2, . . . , M}. If there is no resources (0 resources) then another SCI format can be used.

6. Dynamic indication of time offset/slot index in Stage-2 SCI container i. Time offset/slot index can be updated if indicated resources can change every re-transmission ii. Implicit indication relative to slot carrying Stage-2 SCI iii. Explicit indication inside stage-2 SCI 7. Duplication of indicated by Stage-2 SCI resources in MAC-CE i. MAC-CE content does not change during re-transmissions of a TB ii. Duplication is used at least for initial transmission. For retransmissions, whether Stage-2 SCI content is duplicated is dependent on whether re-evaluation of feedback resources indicated in Stage 2 SCI is enabled/supported 8. Indication of fixed time offset/slot index in MAC-CE (e.g., start of resource selection window or pointer to the first in time resource in resource set)

9. Introduction and specification of upper bounds or lower bounds for Stage 2 SCI processing time and MAC-CE processing time 10. UE Stage 2 SCI processing time and MAC-CE processing time (including L1/L2 latency components) can be exchanged as a part of UE PC5 capability signaling, so that UEs can take it into account when prepare content (resources) for Stage-2 SCI container together with information on resources for feedback transmission.

11. Introduction and specification of upper bounds or lower bounds for Stage 2 SCI and MAC-CE preparation time 12. UE Stage 2 SCI preparation time and MAC-CE preparation time (including L1/L2 latency components) can be exchanged as a part of UE PC5 capability signaling, so that UEs can take it into account when prepare content for Stage-2 SCI container (preferred/non-preferred resources)

Systems and Implementations

Figure 3:
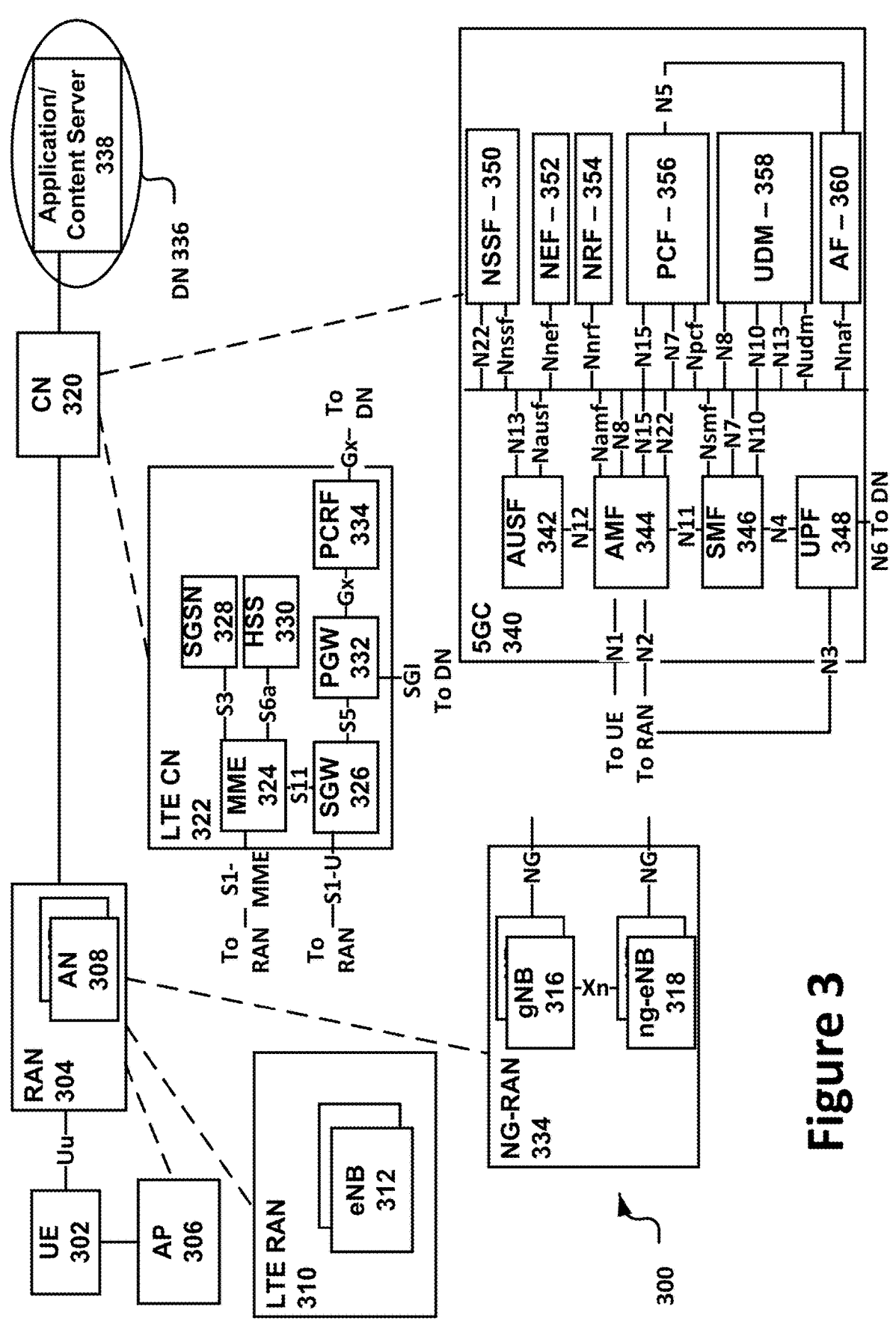
FIG. 3 schematically illustrates a wireless network in accordance with various embodiments.
Figure 4:
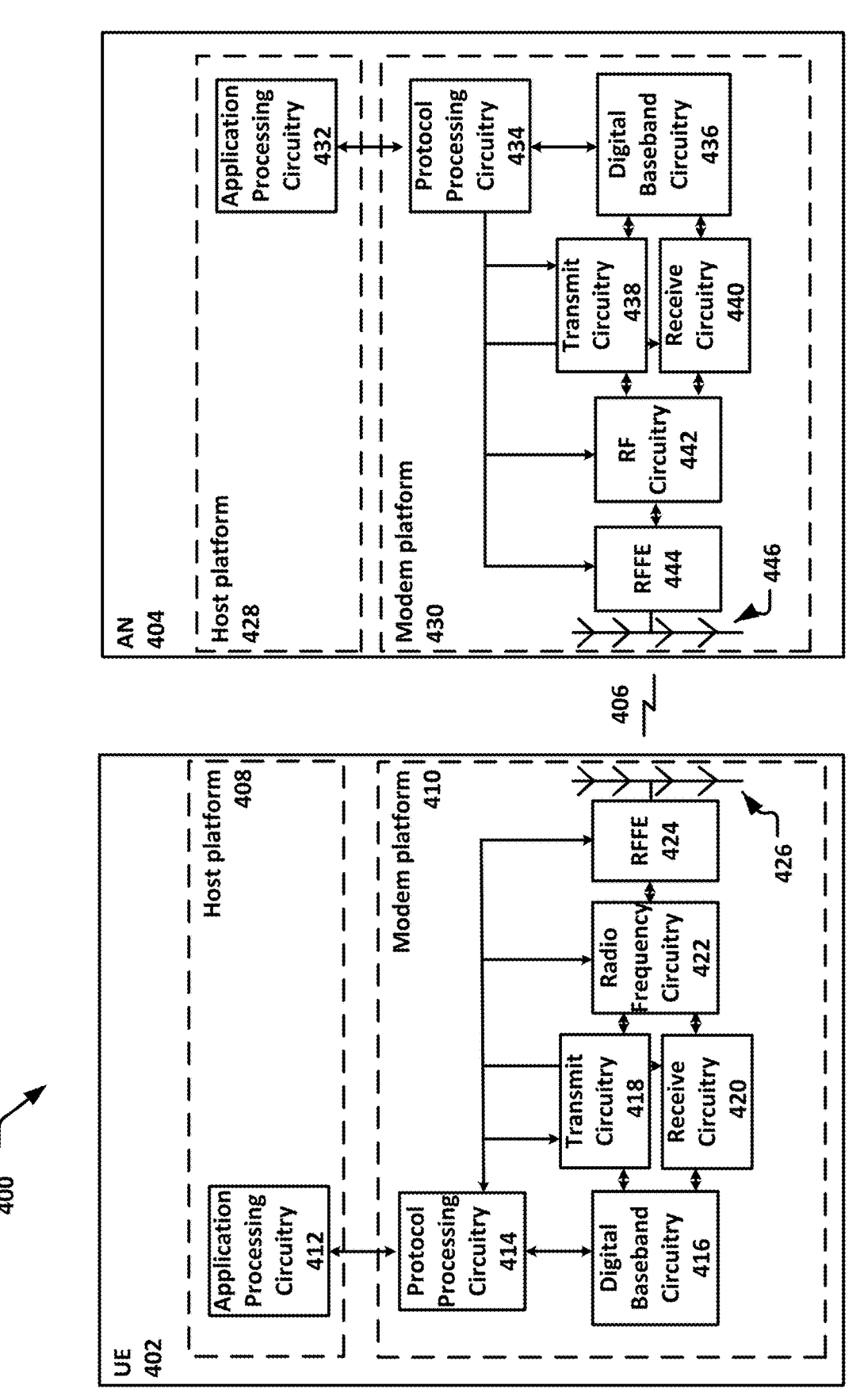
FIG. 4 schematically illustrates components of a wireless network in accordance with various embodiments.
Figure 5:
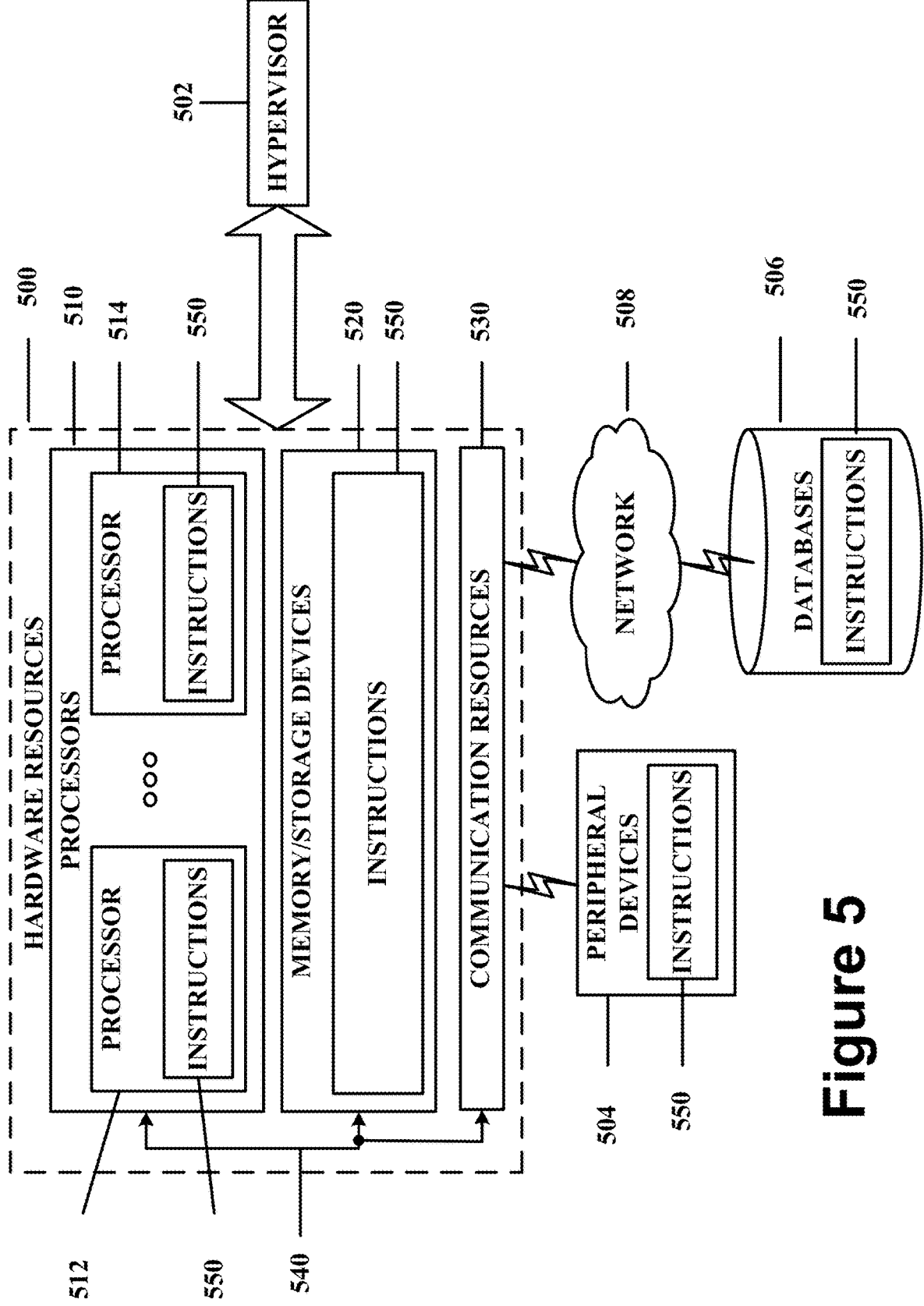
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 3-5 illustrate various systems, devices, and components that may implement aspects of disclosed embodiments.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be communicatively coupled with the RAN 304 by a Uu interface. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/ software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/ subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an S1 interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 3 36 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350 may also determine allowed NSSAI and the mapping to the subscribed S-NS-SAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3rd party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHz frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Example Procedures

In some embodiments, the electronic device(s), network(s), system(s), chip(s) or component(s), or portions or implementations thereof, of FIGS. 3-5, or some other figure herein, may be configured to perform one or more processes, techniques, or methods as described herein, or portions thereof. One such process 600 is depicted in FIG. 6. The process 600 may be performed by a user equipment (UE) in a 5G network, or a portion thereof. At 602, the process 600 may include receiving an indication of a first resource set for inter-UE coordination information from another UE for sidelink communication. At 604, the process 600 may further include selecting a second resource set for a transmission by the UE based on the first resource set, wherein resources of the first resource set are excluded from consideration for the second resource set if the feedback information is to be transmitted using medium access control-control element (MAC-CE) signaling and sidelink control information (SCI) signaling and the resources are after a first time period from the indication, and wherein resources of the first resource set are excluded from consideration for the second resource set if the feedback information is to be transmitted using only MAC-CE signaling and the resources are after a second time period from the indication, wherein the second time period is longer than the first time period.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example A1 may include an inter-UE coordination resource set signaling scheme

Example A2 may include the scheme in example A1 or some other example herein, where the resource set(s) are transmitted in the 2nd stage SCI Example A3 may include the scheme in example A2 or some other example herein, where the presence of inter-UE coordination information is indicated in the 1st stage SCI a. The scheme in 3 where the presence of one following combination of resource sets is present in the $2^{nd}$ stage SCI is signaled in the first stage:
    i. Preferred resource set
    ii. Non-preferred resource set
    iii. Non-preferred half duplex set
    iv. Any combination of the above Example A4 may include the scheme in example A2 or some other example herein, where the 1st stage SCI is indicating the presence of only one resource set of the following list in addition to signaling the number of resources in the set.
    i. Preferred resource set
    ii. Non-preferred resource set
    iii. Non-preferred half duplex set Example A5 may include the scheme in example A2 or some other example herein, where only the presence of inter-UE coordination information is indicated in the 1st stage SCI and which resource set and the number of resources is used is indicated in the 2nd stage itself Example A6 may include the scheme in example A2 or some other example herein, where the 2nd stage SCI is split into a section based on Rel. 16 2nd stage formats and one section for inter-UE coordination.

Example A7 may include the scheme in example A2 or some other example herein, where the 2nd stage SCI contains the following fields per resource set
  a. Number of resources
  b. Time resource indicator values
  c. Frequency resource indicator values
  d. Preserve value
  e. Starting time slot of each triplet
  f. Starting sub-channel for one additional slot
  g. Any combination of the above Example A8 may include the SCI content in example A7 or some other example herein, where the starting slot of a triplet is signaled as:
  a. With respect to previous agreed reference slot
  b. First one relative to the slot which contains the SCI
  c. All except the first one relative to the preceding one
  d. The last L bits of the system frame number Example A9 may include the scheme in example A2 or some other example herein, where the following parameters are (pre)-configured, part of the inter-UE coordination feedback request or are agreed during the uni/groupcast connection setup:
  a. Number of reserved resources per TRIV
  b. Number of triplets signaled in the SCI Example A10 may include the scheme in example A1 or some other example herein, where the resource set(s) are transmitted in a MAC CE container:

Example A11 may include the scheme in example A10 or some other example herein, where the following resource sets are signaled:
  a. Preferred resource set
  b. Non-preferred resource set
  c. Non-preferred half duplex set
  d. Any combination of the above Example A12 may include the scheme in example A10 or some other example herein, where the following information is signaled pers resource set:
  a. Number of resources
  b. Time resource indicator values
  c. Frequency resource indicator values
  d. Preserve value
  e. Starting time slot of each triplet
  f. Starting sub-channel for one additional slot
  g. Any combination of the above Example A13 may include the MAC CE content per resource set an example A12 or some other example herein, where the starting slot of a triplet is signaled as:
  a. With respect to previous agreed reference slot
  b. All except the first one relative to the preceding one
  c. The last L bits of the system frame number Example A14 may include the scheme in example A10 or some other example herein where the following parameters are (pre)-configured, part of the inter-UE coordination feedback request or are agreed during the uni/groupcast connection setup:
  a. Number of reserved resources per TRIV
  b. Number of triplets signaled in the SCI Example B1 may include a method of sidelink inter-UE coordination feedback over two radio-layer containers: Stage-2 SCI over physical layer and MAC-CE over L2 signaling.

Example B2 may include the method of example B1 or some other example herein, wherein MAC-CE container carries full inter-UE coordination feedback or on preferred or non-preferred resources sets.

Example B3 may include the method of example B2 or some other example herein, wherein content of MAC-CE inter-UE coordination feedback on preferred or non-preferred resources sets is generated Tproc,1 before initial transmission and does not change during retransmissions.

Example B4 may include the method of example B1 or some other example herein, wherein Stage-2 SCI container carries latency-critical part of inter-UE coordination feedback on preferred or non-preferred resources sets for initial transmission.

Example B5 may include the method of example B4 or some other example herein, wherein Stage-2 SCI container carries early(first) in time resources from preferred or non-preferred resource sets.

Example B6 may include the method of example B4 or some other example herein, wherein Stage-2 SCI content is re-evaluated and updated for each Stage-2 SCI transmission of a given TB, based on resource sets generated before initial transmission or re-evaluated resource sets.

Example B7 may include the method of example B4 or some other example herein, wherein Stage-2 SCI provides dynamic indication of the number of resources/resource combinations signaled in each Stage-2 SCI transmission {0, 1, 2, . . . , M}. Maximum number of resources indicated is configurable from {0, 1, 2, . . . , M}. If there is no resources (0 resources) then another SCI format can be used.

Example B8 may include the method of example B1 or some other example herein, wherein upper or lower bounds are defined for preparation time of Stage-2 SCI or MAC-CE containers carrying inter-UE coordination information.

Example B9 may include the method of example B1 or some other example herein, wherein upper or lower bounds are defined for processing time of Stage-2 SCI or MAC-CE containers carrying inter-UE coordination information.

Example B10 may include the method of example B1 or some other example herein, wherein MAC-CE includes time offset field pointing to the start slot of the resource selection window used for feedback or to the slot with the first in time resource of indicated resource sets. Alternatively, slot index of initial transmission or some other time reference can be used.

Example B11 may include UE Stage 2 SCI and MAC-CE processing or preparation time are exchanged as a part of UE PC5 capability signaling.

Example B12 may include a method of a UE, the method comprising:

generating UE coordination feedback information for sidelink communication;

encoding a first portion of the UE coordination feedback information for transmission in a sidelink control information (SCI); and encoding a second portion of the UE coordination feedback information for transmission in a medium access control (MAC) control element (CE).

Example B13 includes a method to be performed by a user equipment (UE) in a fifth generation (5G) cellular network, wherein the method comprises: identifying, by the UE, an indication in first or second stage sidelink control information (SCI); identifying, in the second stage SCI by the UE based on the indication, an indication of one or more resource sets; and performing, by the UE, inter-UE coordination signaling based on the one or more resource sets.

Example C1 includes one or more non-transitory computer-readable media (NTCRM) having instructions, stored thereon, that when executed by one or more processors of a user equipment (UE) configure the UE to: receive an indication of a first resource set for inter-UE coordination information from another UE for sidelink communication; and select a second resource set for a transmission by the UE based on the first resource set, wherein resources of the first resource set are excluded from consideration for the second resource set if the feedback information is to be transmitted using medium access control-control element (MAC-CE) signaling and sidelink control information (SCI) signaling and the resources are after a first time period from the indication, and wherein resources of the first resource set are excluded from consideration for the second resource set if the feedback information is to be transmitted using only MAC-CE signaling and the resources are after a second time period from the indication, wherein the second time period is longer than the first time period.

Example C2 includes the one or more NTCRM of example C1, wherein: the first time period corresponds to a first processing time; and the second time period corresponds to the first processing time plus a second processing time.

Example C3 includes the one or more NTCRM of example C1, wherein the first resource set includes a same set of resources for an initial MAC-CE transmission and a MAC-CE re-transmission.

Example C4 includes the one or more NTCRM of example C1, wherein the instructions, when executed, are further to configure the UE to send the transmission using the selected second resource set.

Example C5 includes the one or more NTCRM of example C1, wherein the first resource set is a non-preferred resource set.

Example C6 includes the one or more NTCRM of example C1, wherein the indication of the first resource set is included in a SCI.

Example C7 includes the one or more NTCRM of example C6, wherein the SCI includes a resource set type to indicate whether the first resource set is a preferred resource set or a non-preferred resource set.

Example C8 includes the one or more NTCRM of example C6, wherein the SCI indicates multiple sets of resources, wherein each set of resources is indicated by a respective time resource indicator, a frequency resource indicator, and a resource reservation period.

Example C9 includes one or more non-transitory computer-readable media (NTCRM) having instructions, stored thereon, that when executed by one or more processors of a user equipment (UE) configure the UE to: receive a second stage sidelink control information (SCI) that includes an indication of resources for UE coordination information for sidelink communication; and decode the UE coordination information according to the indicated resources.

Example C10 includes the one or more NTCRM of example C9, wherein the SCI includes a resource set type to indicate whether the resources correspond to a preferred resource set or a non-preferred resource set.

Example C11 includes the one or more NTCRM of example C9, wherein the SCI indicates multiple sets of resources, wherein each set of resources is indicated by a respective time resource indicator, a frequency resource indicator, and a resource reservation period.

Example C12 includes the one or more NTCRM of example C11, wherein a sl-MaxNumPerReserve value associated with each set of resources is the same or different.

Example C13 includes the one or more NTCRM of example C9, wherein the resources are to be used for one or both of SCI signaling and medium access control-control element (MAC-CE) signaling.

Example C14 includes the one or more NTCRM of example C9, wherein the instructions, when executed, are further to configure the UE to receive a first stage SCI that includes an indication that the second stage SCI includes the UE coordination information.

Example C15 includes the one or more NTCRM of example C9, wherein the indication of resources includes an indication of a starting slot for the resources.

Example C16 includes the one or more NTCRM of example C9, wherein the indication of resources includes an indication of a number of resources in a resource set.

Example C17 includes the one or more NTCRM of example C9, wherein the second stage SCI further includes an indication of a set of the UE coordination information that is included in the SCI.

Example Z01 may include an apparatus comprising means to perform one or more elements of a method described in or related to any of examples A1-A14, B1-B13, C1-C17, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A14, B1-B13, C1-C17, or any other method or process described herein.

Example Z03 may include an apparatus comprising logic, modules, or circuitry to perform one or more elements of a method described in or related to any of examples A1-A14, B1-B13, C1-C17, or any other method or process described herein.

Example Z04 may include a method, technique, or process as described in or related to any of examples A1-A14, B1-B13, C1-C17, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A14, B1-B13, C1-C17, or portions thereof.

Example Z06 may include a signal as described in or related to any of examples A1-A14, B1-B13, C1-C17, or portions or parts thereof.

Example Z07 may include a datagram, packet, frame, segment, protocol data unit (PDU), or message as described in or related to any of examples A1-A14, B1-B13, C1-C17, or portions or parts thereof, or otherwise described in the present disclosure.

Example Z08 may include a signal encoded with data as described in or related to any of examples A1-A14, B1-B13, C1-C17, or portions or parts thereof, or otherwise described in the present disclosure.

Example Z09 may include a signal encoded with a datagram, packet, frame, segment, protocol data unit (PDU), or message as described in or related to any of examples A1-A14, B1-B13, C1-C17, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A14, B1-B13, C1-C17, or portions thereof.

Example Z11 may include a computer program comprising instructions, wherein execution of the program by a processing element is to cause the processing element to carry out the method, techniques, or process as described in or related to any of examples A1-A14, B1-B13, C1-C17, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

3GPP Third Generation ARP Allocation and C-RNTI Cell Radio Partnership Project Retention Priority Network Temporary 4G Fourth Generation ARQ Automatic Repeat Identity 5G Fifth Generation Request CA Carrier Aggregation, 5GC 5G Core network AS Access Stratum Certification AC Application ASP Application Authority Client Service Provider CAPEX CAPital ACR Application Context EXpenditure Relocation ASN.1 Abstract Syntax CBRA Contention Based ACK Acknowledgement Notation One Random Access ACID Application AUSF Authentication CC Component Carrier, Client Identification Server Function Country Code, AF Application AWGN Additive Cryptographic Function White Gaussian Noise Checksum AM Acknowledged BAP Backhaul CCA Clear Channel Mode Adaptation Protocol Assessment AMBR Aggregate BCH Broadcast Channel CCE Control Channel Maximum Bit Rate BER Bit Error Ratio Element AMF Access and Mobility BFD Beam Failure CCCH Common Control Management Detection Channel Function BLER Block Error Rate CE Coverage AN Access Network BPSK Binary Phase Shift Enhancement ANR Automatic Keying CDM Content Delivery Neighbour Relation BRAS Broadband Remote Network AOA Angle of Access Server CDMA Code-Arrival BSS Business Support Division Multiple AP Application System Access Protocol, Antenna BS Base Station CDR Charging Data Port, Access Point BSR Buffer Status Report Request API Application BW Bandwidth CDR Charging Data Programming Interface BWP Bandwidth Part Response APN Access Point Name CFRA Contention Free Random Access CG Cell Group CPD Connection Point CSI-IM CSI CGF Charging Descriptor Interference Gateway Function CPE Customer Premise Measurement CHF Charging Equipment CSI-RS CSI Function CPICH Common Pilot Reference Signal CI Cell Identity Channel CSI-RSRP CSI CID Cell-ID (e.g., CQI Channel Quality reference signal positioning method) Indicator received power CIM Common CPU CSI processing unit, CSI-RSRQ CSI Information Model Central Processing reference signal CIR Carrier to Unit received quality Interference Ratio C/R Command/Response CSI-SINR CSI signal-CK Cipher Key field bit to-noise and interference CM Connection CRAN Cloud Radio Access ratio Management, Conditional Network, Cloud CSMA Carrier Sense Mandatory RAN Multiple Access
CMAS Commercial Mobile CRB Common Resource CSMA/CA CSMA with
Alert Service Block collision avoidance
CMD Command CRC Cyclic Redundancy CSS Common Search
CMS Cloud Management Check Space, Cell-specific
System CRI Channel-State Search Space
CO Conditional Information Resource CTF Charging
Optional Indicator, CSI-RS Trigger Function
CoMP Coordinated Multi-Resource Indicator CTS Clear-to-Send
Point C-RNTI Cell RNTI CW Codeword
CORESET Control CS Circuit Switched CWS Contention Window
Resource Set CSCF call session Size
COTS Commercial Off-control function D2D Device-to-Device
The-Shelf CSAR Cloud Service DC Dual Connectivity,
CP Control Plane, Archive Direct Current
Cyclic Prefix, Connection CSI Channel-State DCI Downlink Control
Point Information Information DF Deployment Flavour
DL Downlink ECCA extended clear EHE Edge
DMTF Distributed channel assessment, Hosting Environment
Management Task Force extended CCA EGMF Exposure
DPDK Data Plane ECCE Enhanced Control Governance Management
Development Kit Channel Element, Function
DM-RS, DMRS Enhanced CCE EGPRS Enhanced Demodulation ED Energy Detection GPRS
Reference Signal EDGE Enhanced Datarates EIR Equipment Identity
DN Data network for GSM Evolution Register
DNN Data Network (GSM Evolution) eLAA enhanced Licensed
Name EAS Edge Assisted Access,
DNAI Data Network Application Server enhanced LAA
Access Identifier EASID Edge EM Element Manager Application Server eMBB Enhanced Mobile
DRB Data Radio Bearer Identification Broadband
DRS Discovery ECS Edge EMS Element
Reference Signal Configuration Server Management System
DRX Discontinuous ECSP Edge eNB evolved NodeB, E-Reception Computing Service UTRAN Node B
DSL Domain Specific Provider EN-DC E-UTRA-NR
Language. Digital EDN Edge Data Dual Connectivity
Subscriber Line Network EPC Evolved Packet
DSLAM DSL Access EEC Edge Core
Multiplexer Enabler Client EPDCCH enhanced
DwPTS Downlink EECID Edge PDCCH, enhanced
Pilot Time Slot Enabler Client Physical Downlink
E-LAN Ethernet Identification Control Cannel
Local Area Network EES Edge EPRE Energy per resource
E2E End-to-End Enabler Server element
EAS Edge Application EESID Edge EPS Evolved Packet
Server Enabler Server System Identification
EREG enhanced REG, FACH Forward Access FQDN Fully Qualified
enhanced resource Channel Domain Name
element groups FAUSCH Fast Uplink G-RNTI GERAN ETSI European Signalling Channel Radio Network Telecommunications FB Functional Block Temporary Identity Standards Institute FBI Feedback GERAN GSM EDGE
ETWS Earthquake and Information RAN, GSM EDGE Radio
Tsunami Warning FCC Federal Access Network
System Communications GGSN Gateway GPRS
eUICC embedded UICC, Commission Support Node
embedded Universal FCCH Frequency GLONASS GLObal'naya
Integrated Circuit Card Correction CHannel NAvigatsion-naya
E-UTRA Evolved FDD Frequency Division Sputnik-ovaya
UTRA Duplex Sistema (Engl.:
E-UTRAN Evolved FDM Frequency Division Global Navigation
UTRAN Multiplex Satellite System)
EV2X Enhanced V2X FDMAFrequency Division gNB Next Generation
F1AP F1 Application Multiple Access NodeB
Protocol FE Front End gNB-CU gNB-F1-C F1 Control plane FEC Forward Error centralized unit, Next
interface Correction Generation NodeB
F1-U F1 User plane FFS For Further Study centralized unit
interface FFT Fast Fourier gNB-DU gNB-FACCH Fast Transformation distributed unit, Next
Associated Control feLAA further enhanced Generation NodeB CHannel Licensed Assisted distributed unit
FACCH/F Fast Access, further GNSS Global Navigation
Associated Control enhanced LAA Satellite System Channel/Full rate FN Frame Number GPRS General Packet
FACCH/H Fast FPGA Field-Programmable Radio Service
Associated Control Gate Array GPSI Generic Channel/ Half rate FR Frequency Range Public Subscription Identifier
GSM Global System for HSN Hopping Sequence IEI Information Element Mobile Number Identifier Communications, HSPA High Speed Packet IEIDL Information Element
Groupe Spécial Access Identifier Data
Mobile HSS Home Subscriber Length
GTP GPRS Tunneling Server IETF Internet Engineering
Protocol HSUPA High Speed Task Force
GTP-UGPRS Tunnelling Uplink Packet Access IF Infra-structure
Protocol for User HTTP Hyper Text Transfer IIOT Industrial Internet of
Plane Protocol Things
GTS Go To Sleep Signal HTTPS Hyper Text IM Inter-ference
(related to WUS) Transfer Protocol Measurement,
GUMMEI Globally Secure (https is Intermodulation, IP
Unique MME Identifier http/1.1 over SSL, Multimedia
GUTI Globally Unique i.e. port 443) IMC IMS Credentials
Temporary UE Identity I-Block Information IMEI International Mobile
HARQ Hybrid ARQ, Block Equipment Identity
Hybrid Automatic ICCID Integrated Circuit IMGI International mobile Repeat Request Card Identification group identity HANDO Handover IAB Integrated Access IMPI IP Multimedia HFN HyperFrame and Backhaul Private Identity Number ICIC Inter-Cell IMPU IP Multimedia HHO Hard Handover Interference Coordination PUblic identity HLR Home Location ID Identity, identifier IMS IP Multimedia Register IDFT Inverse Discrete Subsystem HN Home Network Fourier Transform IMSI International Mobile HO Handover IE Information element Subscriber Identity HPLMN Home Public IBE In-Band Emission IoT Internet of Things Land Mobile Network IP Internet Protocol HSDPA High Speed IEEE Institute of Ipsec IP Security, Internet Downlink Packet Electrical and Electronics Protocol Security Access Engineers IP-CAN IP-Ki Individual LI Layer Indicator Connectivity Access subscriber LLC Logical Link Network authentication key Control, Low Layer IP-M IP Multicast KPI Key Performance Compatibility IPv4 Internet Protocol Indicator LMF Location Version 4 KQI Key Quality Management Function IPv6 Internet Protocol Indicator LOS Line of Sight Version 6 KSI Key Set Identifier LPLMN Local PLMN IR Infrared ksps kilo-symbols per LPP LTE Positioning IS In Sync second Protocol IRP Integration KVM Kernel Virtual LSB Least Significant Bit Reference Point Machine LTE Long Term ISDN Integrated Services L1 Layer 1 (physical Evolution Digital Network layer) LWA LTE-WLAN ISIM IM Services Identity L1-RSRP Layer 1 aggregation Module reference signal LWIP LTE/WLAN Radio ISO International received power Level Integration with Organisation for L2 Layer 2 (data link IPsec Tunnel Standardisation layer) LTE Long Term ISP Internet Service L3 Layer 3 (network Evolution Provider layer) M2M Machine-to-IWF Interworking- LAA Licensed Assisted Machine Function Access MAC Medium Access I-WLAN Interworking LAN Local Area Network Control (protocol WLAN LADN Local Area layering context) Constraint length of Data Network MAC Message the convolutional code, LBT Listen Before Talk authentication code USIM Individual key LCM LifeCycle (security/encryption kB Kilobyte (1000 Management context)

bytes) LCR Low Chip Rate MAC-A MAC used kbps kilo-bits per second LCS Location Services for authentication and Kc Ciphering key LCID Logical key agreement (TSG T Channel ID WG3 context)

MAC-IMAC used for data MIB Master Information MPLS MultiProtocol Label integrity of signalling Block, Management Switching messages (TSG T Information Base MS Mobile Station WG3 context) MIMO Multiple Input MSB Most Significant Bit MANO Management Multiple Output MSC Mobile Switching and Orchestration MLC Mobile Location Centre MBMS Multimedia Centre MSI Minimum System Broadcast and Multicast MM Mobility Information, MCH Service Management Scheduling MB SFN Multimedia MME Mobility Information Broadcast multicast Management Entity MSID Mobile Station service Single Frequency MN Master Node Identifier Network MNO Mobile MSIN Mobile Station MCC Mobile Country Network Operator Identification Code MO Measurement Number MCG Master Cell Group Object, Mobile MSISDN Mobile MCOTMaximum Channel Originated Subscriber ISDN Occupancy Time MPBCH MTC Number MCS Modulation and Physical Broadcast MT Mobile Terminated, coding scheme CHannel Mobile Termination MDAF Management Data MPDCCH MTC MTC Machine-Type Analytics Function Physical Downlink Communications MDAS Management Data Control CHannel mMTCmassive MTC, Analytics Service MPDSCH MTC massive Machine- MDT Minimization of Physical Downlink Type Communications Drive Tests Shared CHannel MU-MIMO Multi User ME Mobile Equipment MPRACH MTC MIMO MeNB master eNB Physical Random MWUS MTC wake-MER Message Error Ratio Access CHannel up signal, MTC WUS MGL Measurement Gap MPUSCH MTC NACK Negative Length Physical Uplink Shared Acknowledgement MGRP Measurement Gap Channel NAI Network Access Repetition Period Identifier NAS Non-Access N-PoP Network Point of NS Network Service Stratum, Non-Access Presence NSA Non-Standalone Stratum layer NMIB, N-MIB Narrowband operation mode NCT Network MIB NSD Network Service Connectivity Topology NPBCH Narrowband Descriptor NC-JT Non-Physical Broadcast NSR Network Service Coherent Joint CHannel Record Transmission NPDCCH Narrowband NS SAINetwork Slice NEC Network Capability Physical Downlink Selection Assistance Exposure Control CHannel Information NE-DC NR-E-UTRA NPDSCH Narrowband S-NNSAI Single-Dual Connectivity Physical Downlink NSSAI NEF Network Exposure Shared CHannel NSSF Network Slice Function NPRACH Narrowband Selection Function NF Network Function Physical Random NW Network NFP Network Access CHannel NWUSNarrowband wake-Forwarding Path NPUSCH Narrowband up signal, Narrowband NFPD Network Physical Uplink WUS Forwarding Path Shared CHannel NZP Non-Zero Power Descriptor NPSS Narrowband O&M Operation and NFV Network Functions Primary Maintenance Virtualization Synchronization ODU2 Optical channel NFVI NFV Infrastructure Signal Data Unit-type 2

NFVO NFV Orchestrator NSSS Narrowband OFDM Orthogonal

NG Next Generation, Secondary Frequency Division

Next Gen Synchronization Multiplexing
NGEN-DC NG-RAN E-Signal OFDMA Orthogonal
UTRA-NR Dual NR New Radio, Frequency Division
Connectivity Neighbour Relation Multiple Access
NM Network Manager NRF NF Repository OOB Out-of-band
NMS Network Function OOS Out of Sync
Management System NRS Narrowband OPEX OPerating
EXpense Reference Signal
OSI Other System PDCCH Physical PNFR Physical
Network
Information Downlink Control Function Record
OSS Operations Support Channel POC PTT over Cellular
System PDCP Packet Data PP, PTP Point-to-OTA over-
the-air Convergence Protocol Point
PAPR Peak-to-Average PDN Packet Data PPP Point-to-
Point
Power Ratio Network, Public Data Protocol
PAR Peak to Average Network PRACH Physical
Ratio PDSCH Physical RACH
PBCH Physical Broadcast Downlink Shared PRB Physi-
cal resource
Channel Channel block
PC Power Control, PDU Protocol Data Unit PRG Physi-
cal resource
Personal Computer PEI Permanent block group
PCC Primary Component Equipment Identifiers ProSe
Proximity Services, Carrier, Primary CC PFD Packet
Flow Proximity-Based
P-CSCF Proxy CSCF Description Service
PCell Primary Cell P-GW PDN Gateway PRS Positioning
PCI Physical Cell ID, PHICH Physical Reference Signal
Physical Cell Identity hybrid-ARQ indicator PRR Packet
Reception
PCEF Policy and Charging channel Radio Enforcement
PHY Physical layer PS Packet Services
Function PLMN Public Land Mobile PSBCH Physical
PCF Policy Control Network Sidelink Broadcast
Function PIN Personal Channel
PCRF Policy Control and Identification Number PSDCH
Physical
Charging Rules PM Performance Sidelink Downlink
Function Measurement Channel
PDCP Packet Data PMI Precoding Matrix PSCCH Physi-
cal
Convergence Protocol, Indicator Sidelink Control
Packet Data Convergence PNF Physical Network Chan-
nel
Protocol layer Function PSSCH Physical PNFD Physical
Network Sidelink Shared Function Descriptor Channel
PSCell Primary SCell RACH Random Access RLC UM
RLC
PSS Primary Channel Unacknowledged Mode
Synchronization RADIUS Remote RLF Radio Link Fail-
ure Signal Authentication Dial In RLM Radio Link
PSTN Public Switched User Service Monitoring
Telephone Network RAN Radio Access RLM-RS Refer-
ence
PT-RS Phase-tracking Network Signal for RLM
reference signal RAND RANDom number RM Registra-
tion
PTT Push-to-Talk (used for Management
PUCCH Physical authentication) RMC Reference
Uplink Control RAR Random Access Measurement
Channel Channel Response RMSI Remaining MSI,
PUSCH Physical RAT Radio Access Remaining Mini-
mum Uplink Shared Technology System Information Channel
RAU Routing Area RN Relay Node
QAM Quadrature Update RNC Radio Network
Amplitude Modulation RB Resource block, Controller
QCI QoS class of Radio Bearer RNL Radio Network
identifier RBG Resource block Layer
QCL Quasi co-location group RNTI Radio Network
QFI QoS Flow ID, QoS REG Resource Element Tempo-
rary Identifier
Flow Identifier Group ROHC RObust Header
QoS Quality of Service Rel Release Compression
QPSK Quadrature REQ REQuest RRC Radio Resource
(Quaternary) Phase Shift RF Radio Frequency Control,
Radio
Keying RI Rank Indicator Resource Control layer
QZSS Quasi-Zenith MV Resource indicator RRM Radio
Resource
Satellite System value Management
RA-RNTI Random RL Radio Link RS Reference Signal
Access RNTI RLC Radio Link Control, RSRP Reference
Signal
RAB Radio Access Radio Link Control layer Received
Power
Bearer, Random RLC AM RLC RSRQ Reference Signal
Access Burst Acknowledged Mode Received Quality
RSSI Received Signal SAPI Service Access SDSF Struc-
tured Data
Strength Indicator Point Identifier Storage Function
RSU Road Side Unit SCC Secondary SDT Small Data
RSTD Reference Signal Component Carrier, Transmis-
sion
Time difference Secondary CC SDU Service Data Unit
RTP Real Time Protocol SCell Secondary Cell SEAF
Security Anchor
RTS Ready-To-Send SCEF Service Function
RTT Round Trip Time Capability Exposure SeNB sec-
ondary eNB
Rx Reception, Function SEPP Security Edge
Receiving, Receiver SC-FDMA Single Protection Proxy
S1AP S1 Application Carrier Frequency SFI Slot format
Protocol Division Multiple indication
S1-MME S1 for the Access SFTD Space-Frequency
control plane SCG Secondary Cell Time Diversity, SFN
and
S1-U S1 for the user plane Group frame timing difference
S-CSCF serving SCM Security Context SFN System
Frame
CSCF Management Number
S-GW Serving Gateway SCS Subcarrier Spacing SgNB
Secondary gNB
S-RNTI SRNC Radio SCTP Stream Control SGSN Serv-
ing GPRS
Network Temporary Transmission Support Node
Identity Protocol S-GW Serving Gateway
S-TMSI SAE SDAP Service Data SI System Information
Temporary Mobile Adaptation Protocol, SI-RNTI System
Station Identifier Service Data Adaptation Information
RNTI
SA Standalone Protocol layer SIB System Information
operation mode SDL Supplementary Block
SAE System Architecture Downlink SIM Subscriber
Identity Evolution SDNF Structured Data Module
SAP Service Access Storage Network SIP Session Initi-
ated
Point Function Protocol
SAPD Service Access SDP Session Description SiP Sys-
tem in Package Point Descriptor Protocol SL Sidelink SLA Service Level SSID Service Set SU-MIMO Single User Agreement Identifier MIMO SM Session SS/PBCH Block SUL Supplementary Management SSBRI SS/PBCH Block Uplink SMF Session Resource Indicator, TA Timing Advance, Management Function Synchronization Tracking Area SMS Short Message Signal Block TAC Tracking Area Code Service Resource Indicator TAG Timing Advance SMSF SMS Function SSC Session and Service Group SMTC SSB-based Continuity TAI Tracking Measurement Timing SS-RSRP Area Identity Configuration Synchronization TAU Tracking Area SN Secondary Node, Signal based Reference Update Sequence Number Signal Received TB Transport Block SoC System on Chip Power TBS Transport Block SON Self-Organizing SS-RSRQ Size Network Synchronization TBD To Be Defined SpCell Special Cell Signal based Reference TCI Transmission SP-CSI-RNTISemi-Signal Received Configuration Indicator Persistent CSI RNTI Quality TCP Transmission SPS Semi-Persistent SS-SINR Communication Scheduling Synchronization Protocol SQN Sequence number Signal based Signal to TDD Time Division SR Scheduling Request Noise and Interference Duplex SRB Signalling Radio Ratio TDM Time Division Bearer SSS Secondary Multiplexing SRS Sounding Reference Synchronization TDMATime Division Signal Signal Multiple Access SS Synchronization SSSG Search Space Set TE Terminal Equipment Signal Group TEID Tunnel End Point SSB Synchronization SSSIF Search Space Set Identifier Signal Block Indicator TFT Traffic Flow SST Slice/ Service Types Template TMSI Temporary Mobile UDM Unified Data UTRAN Universal Subscriber Identity Management Terrestrial Radio TNL Transport Network UDP User Datagram Access Network Layer Protocol UwPTS Uplink Pilot TPC Transmit Power UDSF Unstructured Data Time Slot Control Storage Network V2I Vehicle-to-TPMI Transmitted Function Infrastruction Precoding Matrix UICC Universal Integrated V2P Vehicle-to-Indicator Circuit Card Pedestrian TR Technical Report UL Uplink V2V Vehicle-to-Vehicle TRP, TRxP Transmission UM Unacknowledged V2X Vehicle-to-Reception Point Mode everything TRS Tracking Reference UML Unified Modelling VIM Virtualized Signal Language Infrastructure Manager TRx Transceiver UMTS Universal Mobile VL Virtual Link, TS Technical Telecommunications VLAN Virtual LAN, Specifications, System Virtual Local Area Technical Standard UP User Plane Network TTI Transmission Time UPF User Plane Function VM Virtual Machine Interval URI Uniform Resource VNF Virtualized Network Tx Transmission, Identifier Function Transmitting, URL Uniform Resource VNFFG VNF Transmitter Locator Forwarding Graph U-RNTI UTRAN URLLC Ultra-VNFFGD VNF Radio Network Reliable and Low Forwarding Graph Temporary Identity Latency Descriptor UART Universal USB Universal Serial Bus VNFM VNF Manager Asynchronous USIM Universal VoIP Voice-over-IP, Receiver and Subscriber Identity Module Voice-over-Internet Transmitter USS UE-specific search Protocol UCI Uplink Control space VPLMN Visited Information UTRA UMTS Terrestrial Public Land Mobile UE User Equipment Radio Access Network VPN Virtual Private Network VRB Virtual Resource Block WiMAX Worldwide Interoperability for Microwave Access WLANWireless Local Area Network WMAN Wireless Metropolitan Area Network WPANWireless Personal Area Network X2-C X2-Control plane X2-U X2-User plane XML eXtensible Markup Language XRES EXpected user RESponse XOR eXclusive OR ZC Zadoff-Chu ZP Zero Power

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:

receive an indication of a first resource set for inter-UE coordination information from another UE for sidelink communication;

select a second resource set for a transmission by the UE based on the first resource set, wherein resources of the first resource set are excluded from consideration for the second resource set if feedback information is to be transmitted using medium access control-control element (MAC-CE) signaling and sidelink control information (SCI) signaling and the resources are after a first time period from the indication, and wherein resources of the first resource set are excluded from consideration for the second resource set if the feedback information is to be transmitted using only MAC-CE signaling and the resources are after a second time period from the indication, wherein the second time period is longer than the first time period.

2. The one or more NTCRM of claim 1, wherein:

the first time period corresponds to a first processing time; and the second time period corresponds to the first processing time plus a second processing time.

3. The one or more NTCRM of claim 1, wherein the first resource set includes a same set of resources for an initial MAC-CE transmission and a MAC-CE re-transmission.

4. The one or more NTCRM of claim 1, wherein the instructions, when executed, are further to configure the UE to send the transmission using the selected second resource set.

5. The one or more NTCRM of claim 1, wherein the first resource set is a non-preferred resource set.

6. The one or more NTCRM of claim 1, wherein the indication of the first resource set is included in a SCI.

7. The one or more NTCRM of claim 6, wherein the SCI includes a resource set type to indicate whether the first resource set is a preferred resource set or a non-preferred resource set.

8. The one or more NTCRM of claim 6, wherein the SCI indicates multiple sets of resources, wherein each set of resources is indicated by a respective time resource indicator, a frequency resource indicator, and a resource reservation period.

9. One or more non-transitory computer-readable media (NTCRM) having instructions, stored thereon, that when executed by one or more processors of a user equipment (UE) configure the UE to:

receive a second stage sidelink control information (SCI) that includes an indication of resources for UE coordination information for sidelink communication; and decode the UE coordination information according to the indicated resources, wherein resources of a first resource set for inter-UE coordination are excluded from consideration for a second resource set if feedback information is to be transmitted using medium access control-control element (MAC-CE) signaling and sidelink control information (SCI) signaling and the resources are after a first time period from the indication, and wherein resources of the first resource set are excluded from consideration for the second resource set if the feedback information is to be transmitted using only MAC-CE signaling and the resources are after a second time period from the indication, wherein the second time period is longer than the first time period.

10. The one or more NTCRM of claim 9, wherein the SCI includes a resource set type to indicate whether the resources correspond to a preferred resource set or a non-preferred resource set.

11. The one or more NTCRM of claim 9, wherein the SCI indicates multiple sets of resources, wherein each set of resources is indicated by a respective time resource indicator, a frequency resource indicator, and a resource reservation period.

12. The one or more NTCRM of claim 11, wherein a sl-MaxNumPerReserve value associated with each set of resources is the same or different.

13. The one or more NTCRM of claim 9, wherein the resources are to be used for one or both of SCI signaling and medium access control-control element (MAC-CE) signaling.

14. The one or more NTCRM of claim 9, wherein the instructions, when executed, are further to configure the UE to receive a first stage SCI that includes an indication that the second stage SCI includes the UE coordination information.

15. The one or more NTCRM of claim 9, wherein the indication of resources includes an indication of a starting slot for the resources.

16. The one or more NTCRM of claim 9, wherein the indication of resources includes an indication of a number of resources in a resource set.

17. The one or more NTCRM of claim 9, wherein the second stage SCI further includes an indication of a set of the UE coordination information that is included in the SCI.

* * * * *